Dec. 6, 1927. 1,651,464

J. MUIRHEAD ET AL

VENTILATOR

Filed Feb. 28, 1927 2 Sheets-Sheet 1

Inventors
James Muirhead and
David P. Muirhead

Dec. 6, 1927. 1,651,464

J. MUIRHEAD ET AL

VENTILATOR

Filed Feb. 28, 1927 2 Sheets-Sheet 2

Inventors
James Muirhead
and
David P. Muirhead
By King Ingersoll
Attys.

Patented Dec. 6, 1927.

1,651,464

UNITED STATES PATENT OFFICE.

JAMES MUIRHEAD AND DAVID PRAIN MUIRHEAD, OF GLASGOW, SCOTLAND.

VENTILATOR.

Application filed February 28, 1927, Serial No. 171,623, and in Great Britain September 2, 1926.

This invention relates to ventilators or air extractors, more particularly for the compartments of moving vehicles, such as road and rail vehicles, ships' cabins and the like, but applicable also to buildings or other stationary structure requiring ventilation, of the kind wherein air extraction depends upon directing a wind current across the outer end of a straight uptake or outlet, whose inner end opens directly into the space to be ventilated, a cowl or deflector being provided over the outer end of the outlet.

Such ventilators suffer not infrequently from down-draught caused by the wind current entering the uptake or outlet and it is therefore one of the objects of our invention to prevent downdraught without the necessity of fitting a valve or baffle in the uptake or outlet for wholly or partially closing the ventilator.

The improved ventilator is characterized by the provision of a deflector having an inclined surface over each of the two parallel sides of a straight uptake or outlet which opens directly into the space to be ventilated, said inclined surfaces being either unequal or connected by an intermediate surface, so that the angle or angles between the inclined surfaces are situated nearer to one side than the other of the uptake or outlet.

The improved ventilator for vehicles may comprise a pair of oppositely-directed substantially L-shaped air ducts spaced apart and open at each end, the open lower end of one air duct being forwardly directed in relation to the movement of the vehicle and the other air duct having its lower end opening towards the rear of the vehicle. The two air ducts communicate at their upper ends with a space above an uptake or ventilating chamber situated between the two air ducts and open below to the interior of the compartment to be ventilated. The space above the uptake and between the air ducts is closed by a deflector having front and rear inclined surfaces meeting nearer the rear air duct than the front air duct, the upper end of which opens into the ventilating chamber at a higher level than the rear air duct and preferably through a smaller aperture so that, when the vehicle is in motion, air entering the lower end of the front air duct or air inlet is deflected across the upper end of the ventilating chamber into the upper end of the rear duct, from whence it escapes into the atmosphere at the rear. At the same time, the air current induces vitiated air from the ventilating chamber and ejects it through the rear air duct.

In order to adapt our invention to the ventilation of a reversible vehicle, such as a tramway car, or to a building or other stationary structure, it is necessary that both air ducts should open at the same level into the ventilating chamber and that the deflector should have equally inclined front and rear inclined surfaces connected by an upper intermediate surface.

In order that our invention may be more clearly understood, reference is hereinafter made to the accompanying explanatory drawings whereon:—

Fig. 1 is a sectional view, Fig. 2 a plan, Fig. 3 a side view and Fig. 4 an inverted plan of a ventilator for road or rail vehicles, ships' cabins and the like.

Figure 1:
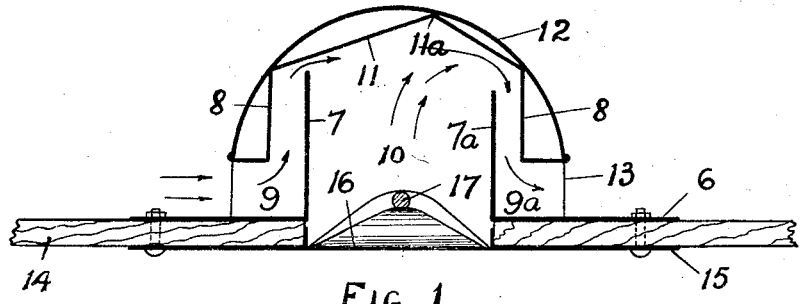
Figure 2:
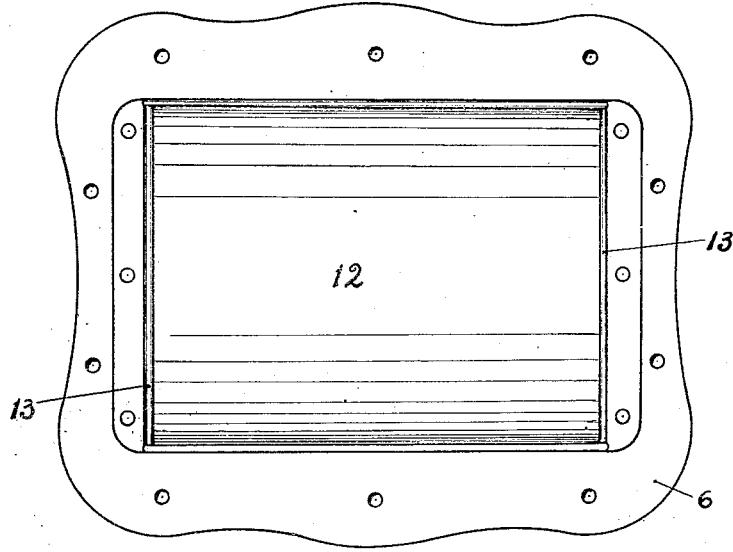

In carrying out our invention, as illustrated in Figs. 1 to 4, the ventilator preferably comprises a base plate 6 of wood, metal, or other suitable material having an aperture therein for communicating with the compartment to be ventilated and a pair of plates or boards forming baffles 7 and 7$^a$ projecting substantially at right angles from the base plate 6, one at each side of the aperture therein. One of the baffles 7 extends a greater distance from the base plate 6 than the other baffle 7$^a$ and is disposed towards the front of the vehicle. Spaced at a distance from each baffle is an L-shaped angle piece 8 or structure of metal or other suitable material, whereby oppositely-directed L-shaped air ducts 9 and 9$^a$ are formed. The air ducts 9 and 9$^a$ and the uptake or ventilating chamber 10 formed by the space between the baffles 7 and 7$^a$ are covered in at the top by a metal or other cover plate or deflector 11 of inverted V shape secured to a semicylindrical shell or casing 12 and to semicircular or V-shaped end plates or members 13 which serve to close the sides of the ventilating chamber 10 and air ducts 9 and 9$^a$. The cover plate or deflector 11 may be ornamented instead of being covered in by the shell or casing 12 or it may have any suitable ornamental covering. The apex 11$^a$ of the deflector or cover plate 11 is situated nearer the rear air duct 9ª than the front air duct 9, so as to ensure that the air current will be deflected into the rear air duct 9ª as indicated by the arrows in Fig. 1.

Figure 3:
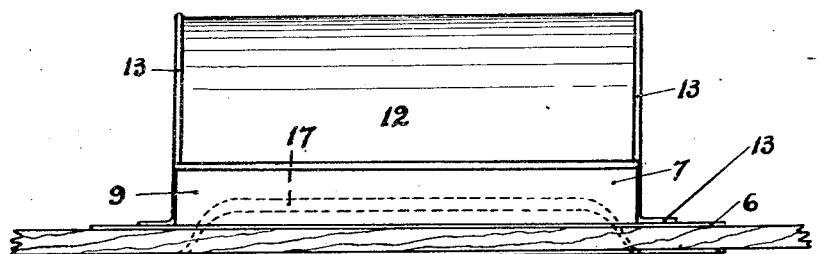
Figure 4:
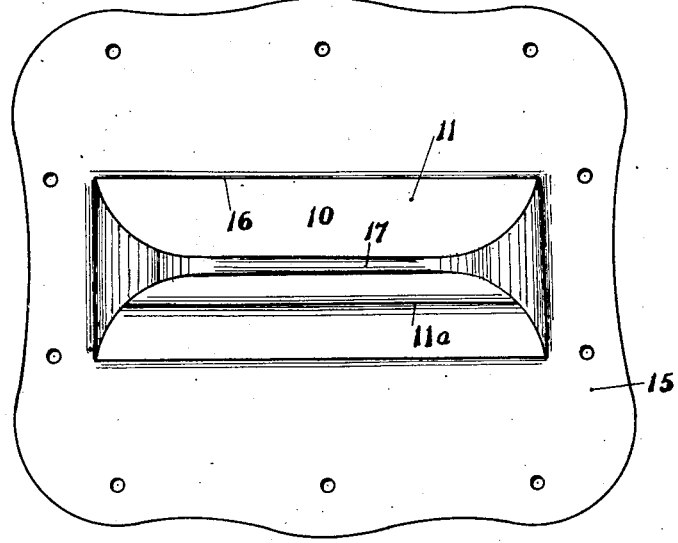
Figure 6:
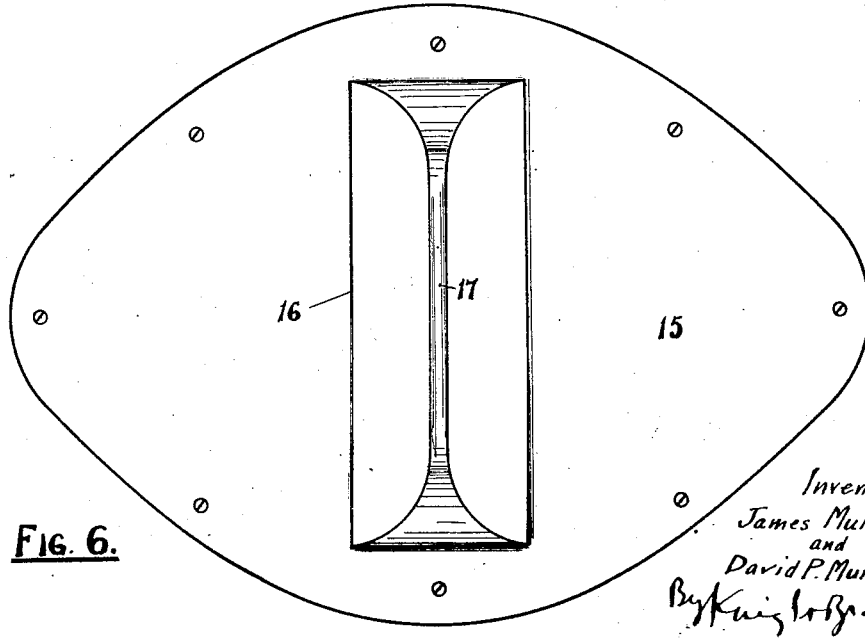
Fig. 6 is a plan view of a modified shape of vent plate.

The ventilating aperture in the roof 14 of the vehicle may be protected by a grid or cage, such that the effective area will not be materially reduced. As shown in Figs. 1, 3 and 4, this may consist of a plate 15 secured to the underside of the roof and having a ventilating aperture 16 therein which is spanned by a grid or bar 17. The bar 17 is preferably situated within the ventilating chamber 10 as seen in Figs. 1 and 3. The plate 15 and bar 17 may be nickel plated or otherwise finished to give an ornamental appearance, and the plate may be of any suitable shape, such as substantially rectangular as in Fig. 4 or oval as in Fig. 6.

To prevent a whistling noise due to the air current rushing across the top of the ventilating chamber 10, the upper edge of the front baffle 7 may be beveled or chamfered or made of cloth or other suitable material, if necessary.

Although we have described the improved ventilator more particularly in its application to ventilating the roof of a compartment, it is to be understood that it is equally applicable as a side ventilator, such as for ships' cabins and the like.

Figure 5:
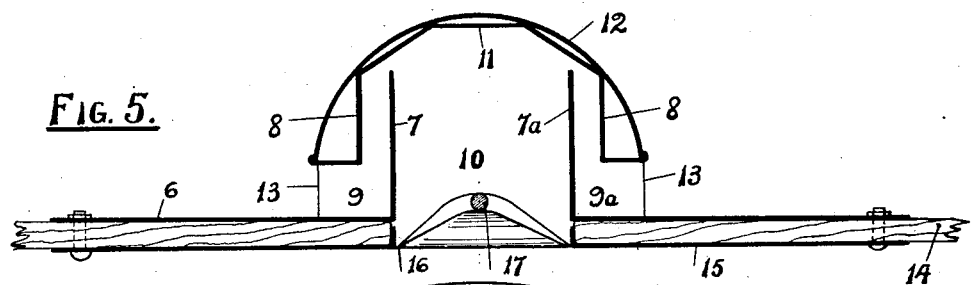
Fig. 5 is a sectional view illustrating a ventilator for reversible vehicles or stationary structures.

In the application of our invention to reversible vehicles, such as tramway cars, or to stationary structures, the baffles 7 and 7ª are of equal height, as shown in Fig. 5, and the deflector 11 is symmetrical as shown, so that the air entering either air duct 9 or 9ª will be deflected into the other air duct and induce the vitiated air from the ventilating chamber 10.

Claims:

1. A ventilator of the character described comprising a straight uptake or outlet having two parallel sides and opening directly into the space to be ventilated, and a deflector having an inclined surface over each of said parallel sides, said surfaces meeting nearer the one side than the other of the uptake or outlet, substantially as described and for the purpose set forth.

2. A ventilator comprising a pair of oppositely-directed substantially L-shaped air ducts spaced apart and open at each end, a ventilating chamber between the two ducts, open below to the compartment to be ventilated and open above to the two ducts, and a deflector over the ducts and ventilating chamber having an inclined surface over each duct, said inclined surfaces being of unequal area, substantially as described.

3. A vehicle ventilator as claimed in claim 2 in which one air duct is forwardly directed and opens into the ventilating chamber at a higher level than the rear duct, substantially as described.

4. A vehicle ventilator as claimed in claim 2 in which one air duct is forwardly directed and opens into the ventilating chamber at a higher level than the rear duct and through a smaller aperture.

5. A vehicle ventilator comprising a base plate apertured for communication with the compartment to be ventilated, a pair of parallel baffles substantially perpendicular to said base plate and one at each side of the aperture therein, a member spaced from and parallel or substantially parallel to each baffle to provide a space open below to form an air duct, a deflector over said baffle, the clearance spaces between the deflector and the baffles being of different size, and end plates closing the sides of said air duct and the ventilating space between them, substantially as described for the purpose set forth.

6. A ventilator according to claim 1 having a casing over the deflector, substantially as described.

7. A ventilator according to claim 1 having a grid at the inner end of the uptake or outlet.

8. A ventilator comprising a base plate apertured for communication with the compartment to be ventilated, a pair of parallel baffles projecting perpendicularly from said base plate, one at each side of the aperture therein, a polygonal structure over said baffles comprising upper oppositely inclined surfaces, intermediate vertical surfaces forming a continuuation of the inclined surfaces alongside of and parallel with each baffle, and horizontal portions forming outward extensions of said vertical surfaces parallel with said base plate, whereby L-shaped ducts are formed on each side of the space between the baffles, and end plates closing the ends of said polygonal structure.

9. A ventilator as claimed in claim 8 wherein one baffle is longer than the other and the inclined surfaces are unequal so that the junction of the two inclined surfaces is situated nearer to the shorter baffle than to the longer baffle.

10. A ventilator as claimed in claim 8 having a shell extending over the polygonal structure from the outer edge of one horizontal portion to the outer edge of the other horizontal portion of the polygonal structure so as to enclose and protect the latter.

11. A ventilator as claimed in claim 8 having a grid across the inner end of the space between the baffles, said grid comprising an apertured plate, the aperture of which is spanned by a bar bent out of the plane of the plate into the space between the baffles.

The foregoing specification signed at Glasgow this twenty-seventh day of January, 1927.

JAMES MUIRHEAD.
DAVID P. MUIRHEAD.